Aug. 29, 1967 H. A. McANINCH 3,338,509
COMPRESSORS
Filed July 7, 1965 4 Sheets-Sheet 3
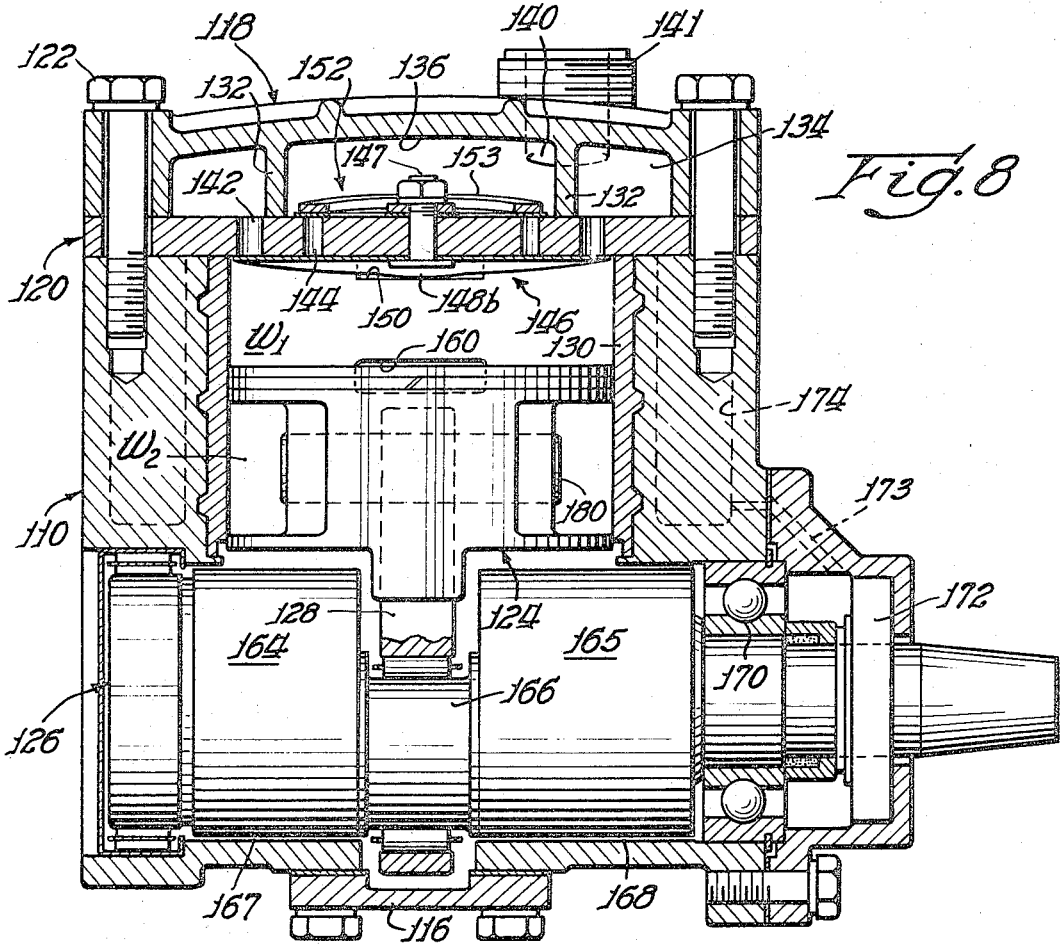
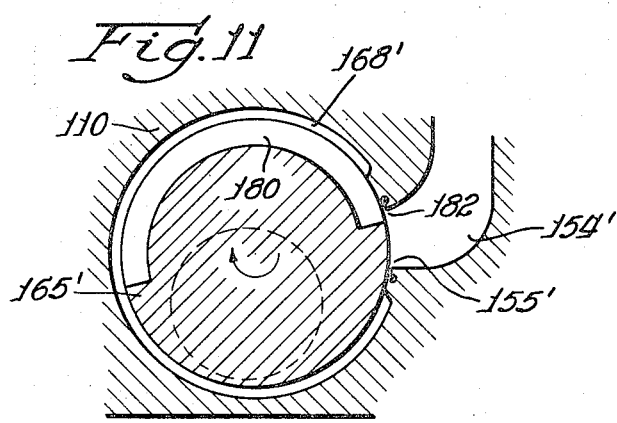
Inventor:
Herbert A. McAninch
By: Thomas B. Hunter Atty.

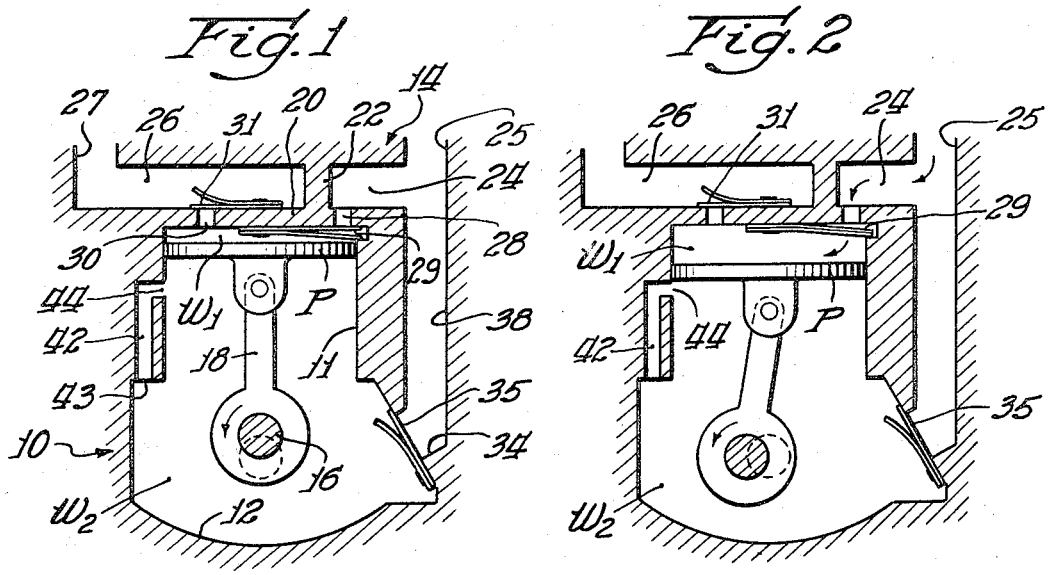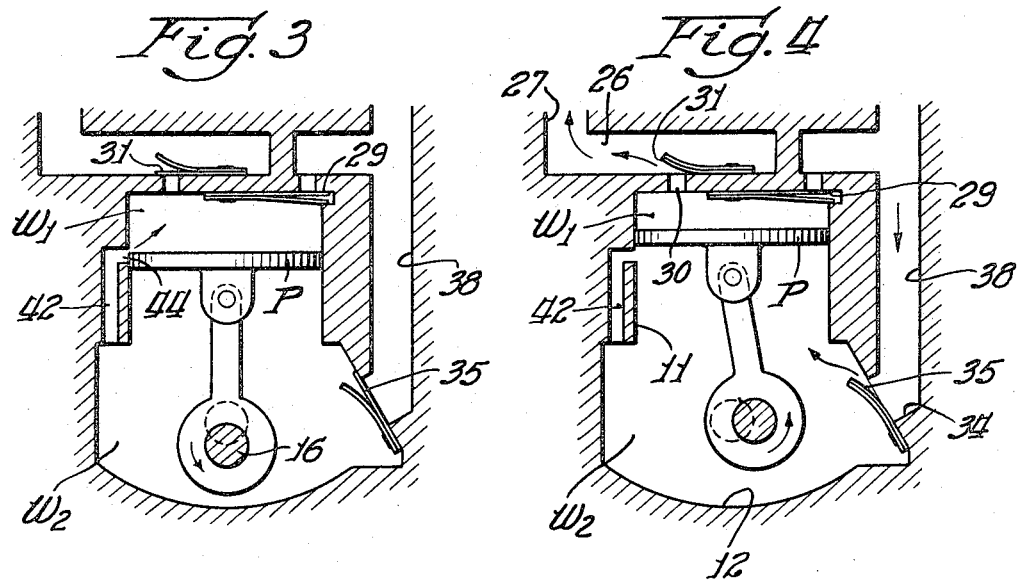

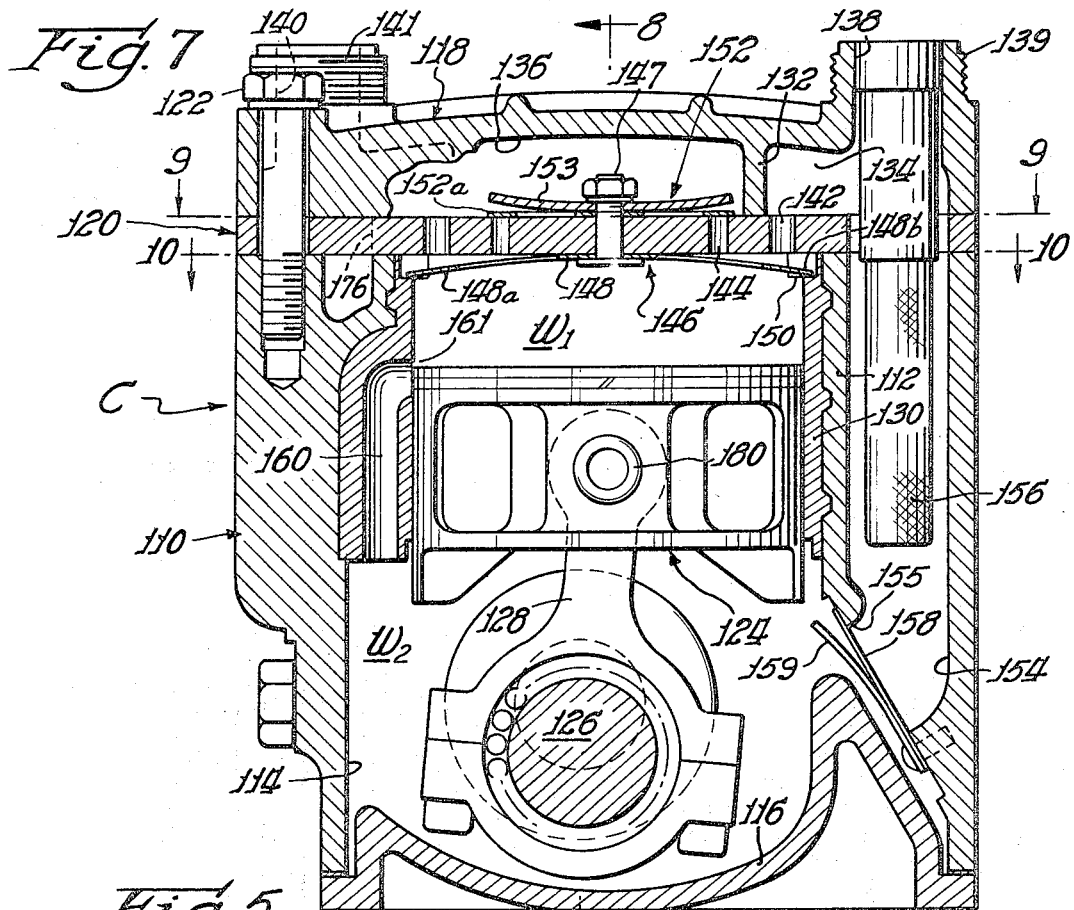

Inventor:
Herbert A. McAninch
By: Thomas B. Hunter, Atty.

United States Patent Office 3,338,509
Patented Aug. 29, 1967

3,338,509
COMPRESSORS
Herbert A. McAninch, Auburn, Ind., assignor to Borg-Warner Corporation, Chicago, Ill., a corporation of Illinois
Filed July 7, 1965, Ser. No. 470,105
8 Claims. (Cl. 230—172)

ABSTRACT OF THE DISCLOSURE

A compressor having a primary working space which is separated by the piston from a secondary working space defined in part by a closed crankcase. Suction and discharge ports communicate with the primary working space, and a secondary suction inlet, provided with a one-way valve, communicates with the secondary working space. A fluid by-pass line allows supercharged gas in the secondary working space to be delivered to the primary working space when the piston reaches its bottom dead-center position.

---

This invention relates to compressors and more particularly to a reciprocating compressor which is characterized by a supercharging feature and means for balancing the torque loads on the crankshaft.

It is a general object of the invention to provide an improved compressor which tends to even the torque load, particularly in a single cylinder compressor and multiple cylinder compressors which are difficult to balance for one reason or another. Another object of the invention is to provide an improved compressor in which each individual cylinder operates functionally as a dual stage unit. Additional objects and advantages will be apparent to those skilled in the art from reading the following description.

In the conventional, reciprocating compressor, a piston reciprocating within a cylinder draws in suction gas during the downstroke of the piston and compresses the gas on the upstroke. Consequently, the torque loading on the crankshaft is appreciably higher during compression of the gas than it is during the suction stroke. This causes undesirable vibration due to the uneven application of the load on various critical parts. While this problem can be alleviated to some degree by using a plurality of cylinders load on various critical parts. While this problem can be arranged so that torque peaks are minimized, this requirement necessarily restricts the design of a compressor for any given application.

The present invention is directed to a compressor which tends to balance out the alternating torque load associated with the reciprocating compressors and also provides supercharging, similar to a two-stage compressor. These characteristics of compressor performance allow the capacity to be increased without increasing the number of cylinders or the bore and stroke dimensions. Consequently, it follows that the weight and cost of the compressor can be minimized for any given capacity requirement; and these features also permit the compressor to be constructed with a relatively short stroke, a design parameter recognized as contributing to longer, more trouble-free operation.

The advantages inherent in the improved compressors disclosed herein can be ascribed to a novel construction including a cylinder and piston assembly arranged so that the piston divides the compressor casing into two separate gas working spaces. Suitable suction and discharge valves are associated with the working spaces such that during travel of the piston in one direction, gas is compressed in one working space and then bypassed or permitted to flow back into the other working space prior to the installation of piston travel in the opposite direction. The gas in the one working space is then compressed while suction gas is admitted to the other working space for compression during the next cycle. Since the piston is working against a load and compression a charge of gas during travel in both directions, the torque load is more even; and at the same time, the capacity is increased because the pressure of the gas charge in the one working space is augmented by the charge of high-pressure gas bypassed from the other working space.

In order to facilitate a complete understanding of the invention, some of the terms used in this specification will relate to conventional compressors. For example, "suction stroke" or "downstroke" of a conventional compressor corresponds to the movement of the piston away from the cylinder head; and the "compression stroke" or "upstroke" refers to movement of the piston toward the head. The terms "top dead-center" and "bottom dead-center" are also used with reference to the piston positions coresponding to the beginning of the suction and discharge strokes respectively of a conventional reciprocating compressor. In the present invention, a charge of gas is compressed during movement of the piston in both directions, so any ambiguity can be avoided by referencing the aforementioned terms to the operation of a conventional reciprocating compressor.

The following detailed description sets forth various illustrative forms that the invention may take, and refers specifically to the accompanying drawings in which:

FIGURE 1 is a schematic diagram of a compressor constructed in accordance with the principles of the present invention, said figure illustrating the piston at its top dead-center position;

FIGURE 2 is a schematic diagram similar to FIGURE 1 showing the piston travelling on the suction stroke;

FIGURE 3 is a schematic diagram similar to FIGURES 1 and 2 showing the piston at its bottom dead-center position;

FIGURE 4 is a schematic diagram similar to FIGURES 1 to 3 showing the piston during its movement on the compression stroke;

FIGURE 5 is a schematic diagram of an alternative embodiment of the invention;

FIGURE 6 is a schematic diagram showing another modification of the invention;

FIGURE 7 is a cross-sectional view of a compressor constructed in accordance with the basic arrangement shown in FIGURES 1 to 4;

FIGURE 8 is a cross-sectional view taken along the plane of line 8—8 of FIGURE 7;

FIGURE 11 is a cross-sectional view illustrating an alternative embodiment of the crankcase inlet valve.

Figure 9:
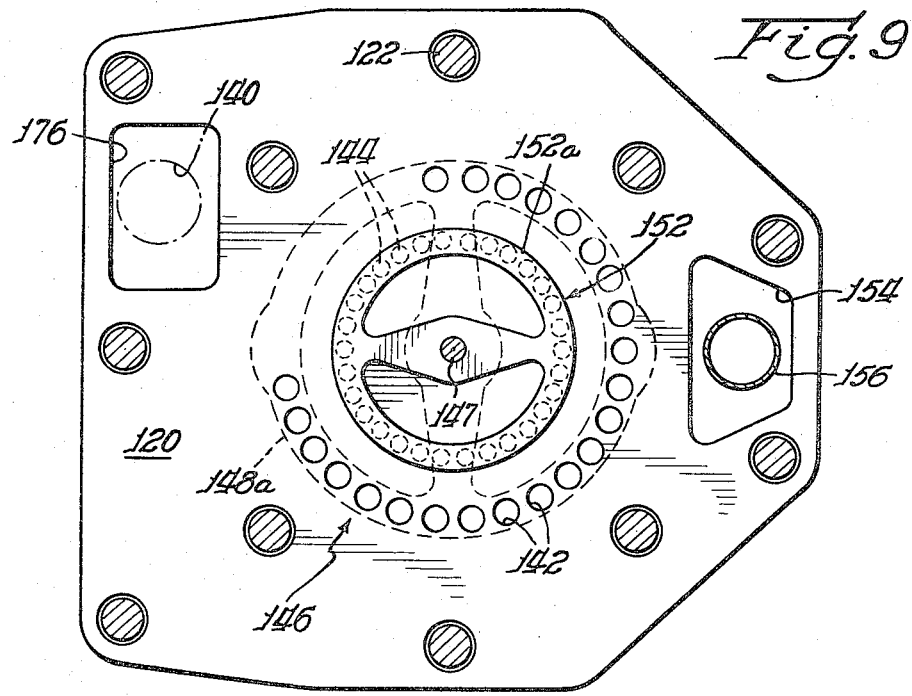
FIGURE 9 is a cross-sectional view taken along the plane of line 9—9 of FIGURE 7.

Referring now to FIGURES 1 to 4, a compressor embodying the principles of the invention comprises a casing including a main housing 10 having an upper, cylinder portion 11 and a lower, crankcase portion 12, and a cylinder head 14. A reciprocating piston P is received within the cylinder 11 and is driven by a crankshaft 16 through connecting rod 18. At the upper end of the cylinder, a valve plate 20 cooperates with a pair of chambers in the head, formed in part by septum 22, to provide suction and discharge plenums 24, 26 connected to suction and discharge lines 25, 27 respectively. An inlet port 28 in valve plate 20 is provided with a valve 29 opening on the suction stroke; and a discharge port 30 is provided with a valve 31 opening on the discharge stroke.

In the crankcase portion 12 there is a secondary gas inlet port 34 and a valve 35 associated therewith, said valve opening on the upstroke of the piston to admit suction gas from a source in common with inlet port 28 through line 38. Expressing the arrangement described above in terms of the functional relationship between the several elements, the space in the cylinder above the piston—that is, between the piston and the valve plate—forms a first working space designated as $W_1$; and the crankcase portion, together with the lower portion of the piston, forms a second working space $W_2$. As the piston reciprocates, the volume of one working space increases while the other decreases with corresponding (inversely related) pressure changes.

Means for bypassing gas from $W_2$ to $W_1$ upon the initiation of the compression stroke is provided by passage 42, said passage having one end 43 communicating with the lower working space $W_2$ and the other end terminating in a port 44 intersecting the cylinder wall 11. This bypass line or passage permits gas within the lower working space $W_2$ to pass into the cylinder portion above the piston (working space $W_1$) when the piston approaches its bottom dead-center position and opens port 44 in the cylinder wall. Port 44 thus opens at a time when the charge of gas in working space $W_2$ approaches its maximum pressure.

Referring specifically now to FIGURE 1, which shows the piston at its top dead-center position, the charge of gas in the cylinder working space has just been passed through valve 31 into the discharge plenum 26. As the piston P begins its movement on the downstroke or suction phase of the cycle, (FIGURE 2) the suction valve 29 opens and a charge of suction gas is drawn in to fill working space $W_1$ while the gas previously admitted to working space $W_2$ is compressed. When the piston approaches the bottom dead-center position (FIGURE 3) and the pressure of the gas in the crankcase has approached its maximum, the piston uncovers port 44 to permit the gas in $W_2$ to pass upwardly through passage 42 into working space $W_1$. The main suction valve 29 closes when high pressure gas from $W_2$ is bypassed and as the piston begins its compression stroke, the piston passes over the cylinder port to close the same and interrupts communication between $W_1$ and $W_2$. As the gas in $W_1$ is compressed the secondary inlet valve in the crankcase 35 opens (FIGURE 4) to admit gas to the crankcase portion (working space $W_2$). Near the end of the compression stroke, the pressure of gas in $W_1$ overcomes the closing force of the discharge valve 31 so that it opens to allow the gas in $W_1$ to pass into the discharge plenum 26, and then through line 27 to the load.

The compressor shown schematically in FIGURE 5 is a modification of the embodiment of FIGURES 1 to 4. As shown therein, the crankshaft 16 drives both piston $P_1$, arranged within the cylinder 11, and another piston $P_2$ in opposed relationship, with piston $P_2$ reciprocating within an auxiliary cylinder portion 50. Piston $P_2$ not only functions as a balancing device for the crankshaft, but also operates as a positively acting, sliding-type valve to control admission of suction gas into the crankcase portion 11 (working space $W_2$) in substantially the same manner as the reed-type, inertial valve of the compressor shown in FIGURES 1 to 4. As the crankshaft continues rotation in a counter-clockwise direction as shown in FIGURE 5, the port 34 intersecting the wall of the auxiliary cylinder 50 is closed by piston $P_2$ while the gas in working space $W_2$ is compressed by movement of both pistons toward each other. At the same time, suction gas is admitted to working space $W_1$ through the primary inlet port 28. When piston $P_1$ uncovers port 44, the supercharged gas within working space $W_2$ passes upwardly through passage 42 into the upper working space $W_1$. In principle, the operation is substantially the same as that of the compressor shown in FIGURES 1 to 4.

Still another modification of the compressor embraced by the present invention is shown in FIGURE 6. In this embodiment, the skirt portion of the piston $P_1$ is arranged to function as a valve controlling admission of the suction gas into working space $W_2$. The skirt portion of piston P, designated at 54, selectively covers and uncovers the auxiliary inlet port 34 which is interconnected to the main suction line 25 through passage 38. Another portion of the skirt includes an aperture 56 selectively registering with the bypass line 42 to control the passage of the higher pressure gas from space $W_2$ to space $W_1$ at the bottom dead-center of the piston P. As the piston moves upwardly from the position shown in FIGURE 6, the lower edge of the skirt 54 uncovers port 34 to permit passage of suction gas into working space $W_2$. At the same time, port 44 in the bypass line is closed by the skirt. On the downstroke, the skirt again closes the auxiliary port 34 and the gas within $W_2$ is compressed until the bottom dead-center position is reached, whereupon aperture 56 registers with the bypass line to permit the supercharged gas in $W_2$ to pass upwardly into space $W_1$.

In view of the several showings of different embodiments of the invention, still more variations will occur to those skilled in the art. The essential elements of the construction include the working spaces above and below the piston, a bypass line selectively providing fluid communication between the two working spaces at a point where the one approaches maximum pressure, and means for controlling admission of suction gas into the one working space during the normal compression stroke of the bypass may also be in the piston.

A preferred compressor for carrying out the principles of the present invention is illustrated in FIGURES 7 to 9 inclusive. This particular compressor corresponds to the one shown schematically in FIGURES 1 to 4 in that the compressor crankcase is provided with a secondary inlet port and a reed-type, inertial valve which is opened during the normal compression stroke.

Referring first to FIGURE 7, the compressor comprises a casing, designated generally by C, including a main housing 110 having an upper cylinder portion 112 and a lower crankcase portion 114, a bottom cover 116, a cylinder head 118, and a valve plate 120 interposed therebetween, said head and valve plate being secured to the upper portion of the main housing 110 by machine screws 122 or other suitable means. Received within the cylinder portion 112 is a piston 124 driven by crankshaft 126 through connecting rod 128. Crankshaft 126 is driven by an external motive force (not shown). Although the piston is shown as being reciprocatively movable within a cylinder liner 130 secured in the cylinder portion of the housing, the liner is optional.

The cylinder head 118 includes a wall or septum 132 which cooperates with the valve plate 120 to divide the head into a suction plenum 134 and a discharge plenum 136. A suction gas passage 138, provided with an external connection 139 for attaching the inlet line, communicates with the suction plenum 134; and a discharge gas passage 140, terminating in an external connection 141 for the discharge gas line, is in fluid communication with discharge plenum 136.

Valve plate 120 is formed with a plurality of inlet ports 142 arranged in a circular pattern (FIGURE 9) and a plurality of discharge ports 144 located radially inwardly thereof which provide fluid communication between working space $W_1$ (above the piston) and the suction and discharge plenums respectively. The suction and discharge valve assembly, designated generally at 146 is of a conventional design and is secured to the valve plate by a bolt or other fastener 147. The suction side of the valve assembly includes a suction valve 148 having an annular portion 148a biased upwardly against the underside of valve plate 120 to normally close the suction ports 142. A stop for the suction valve may take the form of recessed shoulders 150 at the upper end of cylinder liner 130, said shoulders being engaged by tabs 148b on the valve to limit movement thereof. Discharge valve 152 is of a similar design and includes an annular portion 152a biased against the upper surface of valve plate 120 to normally cover the discharge ports 144. A valve stop 153 prevents the discharge valve from lifting too far off the valve plate.

A secondary suction gas passageway 154 is formed in housing 110, said passageway terminating in a port 155 which opens into the crankcase portion 114 of the housing. A filter element 156 is received in passageway 154 through which all suction gas is passed, both to the suction plenum 134 and passageway 154; and since the upper portion of passageway 154 is in direct and open communication with the suction plenum, it is apparent that both are connected to a common source of suction gas through passage 138. A reed type valve 158, including a stop 159, normally closes the secondary inlet port 155, but is adapted to open when a predetermined differential exists between the pressure in working space $W_2$ (underneath the piston) and the pressure of suction gas in passage 154. This, of course, occurs when the piston begins its upward movement, compressing the gas in working space $W_1$ and admitting a charge of suction gas to working space $W_2$.

Figure 10:
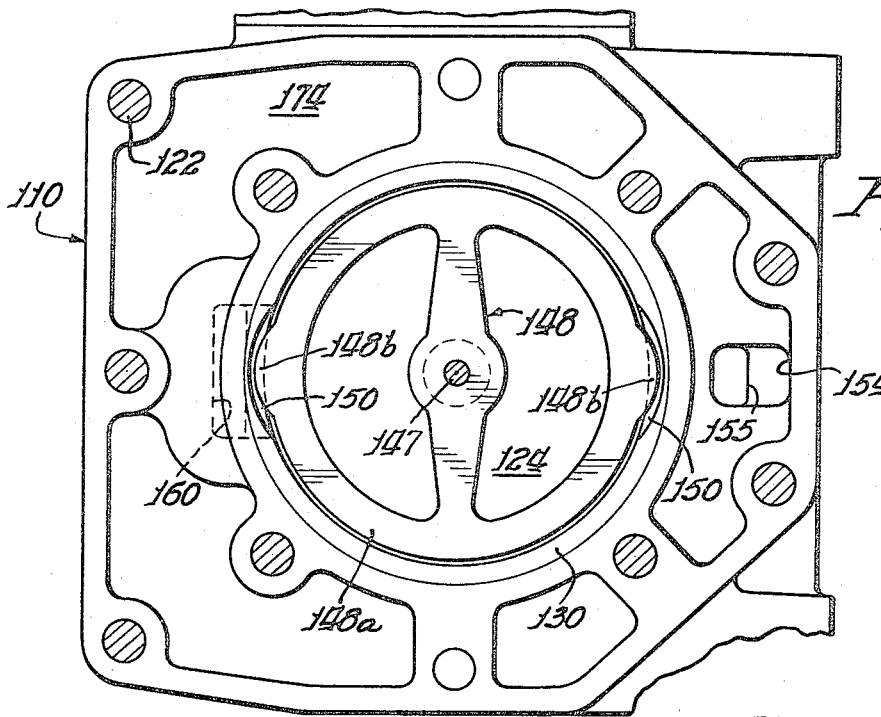
FIGURE 10 is a cross-sectional view taken along the plane of line 10—10 of FIGURE 7.

As best shown in FIGURES 7 and 10, a passage 160, formed in cylinder liner 130 or in housing 110, constitutes a bypass line affording selective fluid communication between the space $W_1$ above the piston and the space $W_2$ below the piston in the crankcase portion. As the piston approaches its bottom dead-center position, the piston uncovers the port 161, i.e., the upper, terminal portion of passage 160, to permit the higher pressure gas in $W_2$ to flow through passage 160 into working space $W_1$. As it begins the normal compression stroke, port 161 is again covered while valve 158 opens (because of the suction condition created in the crankcase portion) to draw in suction gas from passage 154. The charge of gas previously admitted through the suction ports 142, the pressure of which is augmented by the supercharging effect of the gas passing from space $W_2$ to space $W_1$, is now compressed during the upstroke and forced through the discharge valve 152 into the discharge plenum 136 and to the discharge passage 140.

As shown most clearly in FIGURE 8, the unoccupied volume available for suction gas within the crankcase portion, i.e., working space $W_2$, may be minimized by providing enlarged sections or bosses 164, 165 on crankshaft 126, said bosses being located on opposite sides of the connecting rod throw bearing 166. It is apparent that $W_2$ should be as small as possible to obtain maximum compression before being bypassed. This may be accomplished by selecting the proper dimensions of bosses 164, 165 and the clearances 167, 168 between the bosses and the housing 110.

Another feature of the invention, which is for the purpose of further minimizing variations in torque loading on the crankshaft, is the off-set relationship (see FIGURE 7) of the crankshaft axis with regard to the axis of the piston pin 180 (or centerline of the cylinder). While this arrangement (commonly referred to as DeSaxeing) is known, for example, in internal combustion engines of the reciprocating type for reducing piston side loading, it is believed that this feature is a novel adaptation of the DeSaxeing principle for incorporation into a reciprocating compressor.

The operation of this offset relationship can be explained as follows. For every complete revolution of the crankshaft, the piston moves through one complete cycle. It can be seen, however, that the ratio of the time required for the piston to move through its suction stroke to the time required to move through its compression stroke can be varied by changing the position of crankshaft axis relative to the centerline of the cylinder. If the crankshaft is offset so that the compression stroke is about 10°–20° longer than the suction stroke, a mechanical advantage is obtained which further reduces the torque load variations. In a conventional compressor, this could not be done without a serious loss in capacity, due to a shorter time interval where the suction valve is open. In the compressor of the present invention, this is compensated by a *longer* time interval for the secondary suction opening which allows a larger charge to be drawn into $W_2$.

Another modification of the invention is illustrated in FIGURE 11. In this modified form of the invention, the admission of suction gas through the auxiliary inlet to the lower working space $W_2$ is positively controlled by valve means which, in a sense, operates in a fashion similar to the embodiment shown in FIGURE 5. This form of the invention may use a portion of the crankshaft, preferably one of the bosses 164 or 165, to operate as the valve in such a way that gas is admitted during a predetermined portion of the cycle. The boss portion of the crankshaft 165' is provided with a slot 180 extending along a selected arcuate portion of its periphery. The boss is received within a bore in housing 110, similar to the arrangement in FIGURE 8, to provide a narrow clearance 168' between the external diameter of the boss and the bore in housing 110. Along a section of the boss, however, the housing is in running engagement with the external diameter of the boss. The auxiliary inlet passage 154' terminates in a port 155' which, in combination with suitable sealing means 182, forms the throat of the auxiliary inlet valve. The relationship of the slot 180 to the inlet port 155' is such that gas is admitted through approximately 180°–190° of arc (depending on the degree of offsetting) during movement of the piston from its bottom dead-center position upwardly until shortly before the top dead-center position is reached. In the direction of rotation, as shown in FIGURE 11, the piston would have just passed its bottom dead-center position, and the leading end of the slot 180 is just passing into registration with the inlet port 155'. Until the trailing end of slot 180 passes the secondary inlet port 155', the suction gas is continuously admitted and passes through the passageway afforded by slot 180 and the clearance 168' into the working space $W_2$. It is apparent that other valve arrangements, positively controlled by the position of the crankshaft or other means which move in some corresponding relationship to the piston, can be used. For example, a separate, ported disc could be carried by the crankshaft to control the flow of suction gas into $W_2$.

While this invention has been described in connection with certain specific embodiments thereof, it is to be understood that this is by way of illustration and not by way of limitation; and the scope of this invention is defined solely by the appended claims which should be construed as broadly as the prior art will permit.

What is claimed is:

1. A compressor comprising a cylinder and a piston assembly including means defining first and second working spaces separated by said piston; drive means for driving said piston in reciprocating fashion such that during movement of said piston the volume of one said working space is increased while the volume of the other said working space is decreased; first fluid inlet means cooperating with said first working space to admit fluid thereto when the volume of said first working space is expanding; fluid outlet means cooperating with said first working space to discharge fluid therefrom when the volume of said first working space is contracting; second fluid inlet means cooperating with said second working space to admit fluid thereto when the volume of said second working space is expanding, said second fluid inlet means including a valve having a valve member movable alternately to an open position and a closed position; and means coupling said valve member to said drive means so that the position of said valve member is co-ordinated with the position of said piston; and fluid bypass means operative to bypass fluid from said second working space to said first working space when the volume of said second working space is substantially at a minimum, said fluid bypass means including a fluid passage terminating in a port at one end thereof, the other end of said passage being in fluid communication with said second working space, said port opening into said first working space only when the volume of said second working space is at a minimum, said piston cooperating with said port to prevent fluid communication between said first and second working spaces except when the pressure of fluid in said second working space is substantially at a maximum.

2. Apparatus as defined in claim 1 wherein said drive means includes a crankshaft and a connecting rod coupling said crankshaft to said piston, said valve member being carried by and rotatable with said crankshaft, said valve member including means defining a fluid passage operatively associated with said second fluid inlet means to control the admission of fluid to said second working space.

3. Apparatus as defined in claim 1 wherein said valve member comprises a skirt portion of said piston extending axially along a portion of the cylinder wall, said second fluid inlet means terminating in a port opening into said cylinder, said port being located with respect to said piston such that the skirt portion thereof alternately covers and uncovers said port to control the admission of fluid to said second working space.

4. Apparatus as defined in claim 3 wherein said skirt portion is provided with an aperture therein, said fluid bypass means comprising a fluid passage having a first end terminating in a port selectively communicating with said first working space in said cylinder, the other end of said fluid passage terminating in a second port spaced axially along said cylinder from said first port, said aperture selectively registering with said second port when said second working space volume is substantially at a minimum.

5. Apparatus as defined in claim 1 including a second cylinder and piston assembly, said second piston being coupled to said drive means adapted to be driven in counter-reciprocating fashion with respect to said first piston, said second working space being defined, in part, by one side of said second piston, said second fluid inlet means including a port selectively communicating with said second working space, said second piston acting as a movable valve member cooperating with said second cylinder port to control the admission of fluid to said second working space.

6. A compressor comprising a cylinder and piston assembly including means defining first and second working spaces separated by said piston; drive means for driving said piston in reciprocating fashion between a first position wherein the volume of said first working space is at a minimum and a second position when the volume of said second working space is at a minimum; first fluid inlet means including a suction valve operative to admit fluid to said first working space during movement of said piston from said first position to said second position; fluid outlet means including a discharge valve operative to discharge fluid from said first working space during movement of said piston from said second position to said first position; second fluid inlet means including a suction valve operative to admit fluid to said second working space during movement of said piston from said second position to said first position; fluid bypass means operative to bypass high pressure fluid, compressed during movement of said piston from said first position to aid second position, to said first working space as the piston approaches said second position; and a second cylinder and piston assembly; means connecting said second piston to said drive means for driving said second piston in reciprocating fashion, each forming a portion of said second working space so that as they travel toward each other the volume of said second working space is contracted, said second fluid inlet means terminating in a port intersecting said second cylinder, said second piston acting as a movable valve member to control the admission of fluid through said port to said second working space, said second piston closing said port as said first piston travels from an intermediate position to said second position and opening said port when said piston travels from an intermediate position to said first position whereby a volume of fluid is trapped between said pistons and compressed during movement of said pistons toward each other.

7. A compressor comprising a casing including a cylinder; a valve plate closing one end of said cylinder and a substantially closed crankcase associated with the opposite end of said cylinder; a piston in said cylinder, said piston, said cylinder and said valve plate enclosing a first working space, said piston, said cylinder and said crankcase enclosing a second working space; means for driving said piston in reciprocating fashion back and forth between a top dead-center position corresponding to the minimum volume of said first working space and a bottom dead-center position corresponding to minimum volume of said second working space; an inlet and a discharge port in said valve plate; valve means associated with said inlet and discharge ports; an auxiliary inlet port communicating with said second working space; valve means associated with said auxiliary inlet port to admit fluid to said second working space during travel of said piston from said bottom dead-center position to said top dead-center position; fluid passage means having one end terminating in a port intersecting said cylinder, the opposite end of said passage communicating with said crankcase; and valve means including a movable valve member providing selective fluid communication between said first space and said second space when said piston is substantially at its bottom dead-center position, said movable valve member being constituted by a portion of said piston alternatively covering and uncovering said port as it reciprocates 8. Apparatus as defined in claim 7 wherein said drive means includes a rotatable crankshaft and a connecting rod coupling said piston to said crankshaft, the rotational axis of said crankshaft being offset with respect to the axis of said cylinder such that when the crankshaft is rotated at a constant speed, the time for the piston to travel from its bottom dead-center position to its top dead-center position is greater than the time required to travel from its top dead-center position to its bottom dead-center position.

References Cited

UNITED STATES PATENTS

| | | | |
|---|---|---|---|
| 1,298,112 | 3/1919 | Sowden | 230—46 |
| 1,445,073 | 2/1923 | Corpi et al. | 230—46 |
| 1,593,838 | 7/1926 | Michelsen | 74—18.2 |
| 1,770,273 | 7/1930 | Keema | 230—172 |
| 1,891,083 | 12/1932 | Dodge | 230—46 |
| 2,334,939 | 11/1943 | Larson | 230—172 |
| 2,436,854 | 3/1948 | Corey | 230—172 |
| 2,710,137 | 6/1955 | Arnouil | 230—172 |

FOREIGN PATENTS

| | | |
|---|---|---|
| 22,662 | 2/1921 | France. |
| 19,613 | 1913 | Great Britain. |

DONLEY J. STOCKING, *Primary Examiner.*

HENRY F. RADUAZO, *Examiner.*

Disclaimer 3,338,509.—*Herbert A. McAninch*, Auburn, Ind. COMPRESSORS. Patent dated Aug. 29, 1967. Disclaimer filed Aug. 5, 1970, by the assignee, *Borg-Warner Corporation*.

Hereby enters this disclaimer to claims 1, 3, 4, 6, 7 and 8 of said patent.
[*Official Gazette December 8, 1970.*]